United States Patent [19]

Folmar et al.

[11] 4,041,597
[45] Aug. 16, 1977

[54] METHOD OF MANUFACTURING A DIE FOR EXTRUDING HONEYCOMB ARTICLES

[75] Inventors: Robert G. Folmar, Corning; Ronald J. Weetman, Rochester, both of N.Y.

[73] Assignee: Corning Glass Works, Corning, N.Y.

[21] Appl. No.: 716,068

[22] Filed: Aug. 19, 1976

[51] Int. Cl.² .............................................. B23P 17/00
[52] U.S. Cl. ........................................ 29/423; 29/407;
29/464; 29/DIG. 16; 219/98; 219/101;
228/185; 425/464
[58] Field of Search ................. 29/423, 464, 467, 407,
29/559, DIG. 16, DIG. 48; 425/192 R, 464;
228/178, 185, 212; 219/107, 101, 99, 104, 98;
65/31, 33, DIG. 2

[56] References Cited

U.S. PATENT DOCUMENTS

| | | | |
|---|---|---|---|
| 2,933,590 | 4/1960 | Leedy et al. | 219/107 |
| 3,276,854 | 10/1966 | Felker et al. | 29/464 X |
| 3,790,654 | 2/1974 | Bagley | 65/86 X |
| 3,836,302 | 9/1974 | Kaukeinen | 425/197 |
| 3,846,197 | 11/1974 | Wiley | 425/464 X |
| 3,905,743 | 9/1975 | Bagley | 425/464 |
| 3,981,657 | 9/1976 | Orso et al. | 425/464 X |

Primary Examiner—Victor A. DiPalma
Attorney, Agent, or Firm—Burton R. Turner; Clarence R. Patty, Jr.

[57] ABSTRACT

A plurality of individual pre-shaped cores or pins are initially positioned in a prearranged orientation upon an outlet surface of a die body by means of a plate of photosensitive glass or glass-ceramic material which has been etched to form a mask with the desired pattern or arrangement of openings for orienting said cores or pins upon said die surface for subsequent securement thereto such as by welding.

8 Claims, 4 Drawing Figures

METHOD OF MANUFACTURING A DIE FOR EXTRUDING HONEYCOMB ARTICLES

BACKGROUND OF THE INVENTION

In the formation of extrusion dies for making honeycomb structures, the outlet face may be formed with a plurality of sawcuts such as disclosed in U.S. Pat. No. 3,790,654, where the cell pattern to be formed includes continuous linear walls extending transversely across the honeycomb structure, such as when forming honeycomb structures with square, rectangular or triangular cell shapes. However, when the desired cell configuration includes a hex shape as shown in U.S. Pat. No. 2,908,037 or a discontinuous diamond shape as shown in U.S. Pat. No. 3,846,197, methods other than sawcuts must be utilized to form the cell pattern. Such methods may include the incorporation of a plurality of individual cores which are manually positioned on a die body and bolted thereto as shown in the aforementioned U.S. Pat. No. 2,908,037, or the die may be formed of a plurality of laminated etched sheets of photosensitive glass or glass-ceramic material as disclosed in the aformentioned U.S. Pat. No. 3,846,197. However, the use of individually positioned core pins which are bolted to a die body not only requires the precise drilling and tapping of each individual hole for applying the core pins but is also costly and time consuming to manufacture. Further, the use of laminated etched photosensitive glass and glass-ceramic materials for forming a die is also not only expensive and time consuming to manufacture but is not particularly durable when extruding abrasive or viscous material.

Accordingly, the present invention has overcome the problem of forming an extrusion die for forming honeycomb structures by providing a method of initially fixturing a plurality of preshaped core pins in a desired orientation upon a die body so that said pins may be subsequently rigidly secured to the die body such as by welding.

SUMMARY OF THE INVENTION

In its very simplest form, the present invention is directed to an improved method of forming an extrusion die for making honeycomb articles having irregular cells or honeycomb shapes wherein the bounding walls of the cells do not linearly extend transversely across the honeycomb structure. A plurality of cores or pins having virtually identical cross-sectional configurations representing the desired cell shape to be formed, are initially positioned or fixtured within a mask of photosensitive material which has been etched to provide a pattern of openings for receiving such pins in a desired orientation upon the surface of a die body. That is, the pattern of the desired cellular configuration of the honeycomb structure to be formed is etched into the surface of photosensitive glass or glass-ceramic material to form a mask which in fact represents a cross section of the desired honeycomb article to be extruded. The use of the positioning mask for locating the individual pins in a predetermined desired fixtured orientation is critical to the manufacture of the extrusion die since the positionment of each individual core or pin must be exact with uniform spacings therebetween so that the walls forming the cell structure of the extruded product will be of a uniform thickness and the cells formed thereby will be evenly spaced apart and of identical size and shape.

The novel process of the present invention for forming an extrusion die includes the provision of a die body, a plurality of identical bores or pins having the size and shape of the cells to be formed in the extruded product, and a mask of photosensitive material having a pattern of holes or openings etched therethrough representing the exact orientation of the die pins necessary to position and fixture the same upon the die body so as to provide the desired cell structure within an extruded honeycomb article. Preferably, the die body is drilled with a plurality of feed holes arranged so as to intersect with the slots formed between the pins oriented on the outlet face of the die body. The mask having the desired hole configuration and orientation is formed from a master pattern or drawing of such configuration utilizing the processes set forth in U.S. Pat. Nos. 2,628,160 or 2,971,853. A plurality of pins or cores having identical size and shape corresponding to the cell openings to be formed in the extruded product, are produced from suitable metals, such as by extruding the desired shape and cutting such extrusion into equal lengths. In order to effect a good resistance weld between the pins and the outlet surface of the die body, it may be preferable to grind at least one end of the pins if a smooth cut is not obtained so as to provide for full surface contact between the pin ends and the die body. If desired, the grinding of the pin ends may be effected after the pins have been fixtured in the die mask.

The assembly of the pins to the die body is preferably accomplished by positioning the die body within a jig with its outlet face exposed. The mask is positioned over the outlet face by means of alignment pins and the unit is rigidly clamped together to prevent shifting. The pins are then fed manually or automatically to the mask so that each hole in the mask receives a die pin and retains the same in a fixtured position adjacent the outlet face of the die body. A programmed resistance welder then systematically or sequentially presses each pin into intimate contact with the die face and rigidly secures the same thereto through a resistance weld. Upon completion of the welding operation, the glass or glass-ceramic mask is shattered and removed to form a completed extrusion die for forming honeycomb articles having cells of the size and shape represented by the pins and wall portions between the cells as represented by the distance between said pins.

It thus has been an object of the present invention to provide a novel relatively easily manufacturable extrusion die structure for forming thin walled honeycomb articles having a plurality of openings extending therethrough with bounding walls which do not continuously extend linearly across such articles.

A further object of the invention has been to provide an improved method of forming an extrusion die for extruding honeycomb articles with complex shapes wherein a plurality of pre-formed pins of desired size and shape representative of the cells to be formed, are oriented in a predetermined pattern by means of a mask of photosensitive material which has been etched to provide said pattern.

DESCRIPTION OF THE PREFERRED EMBODIMENTS

Figure 1:
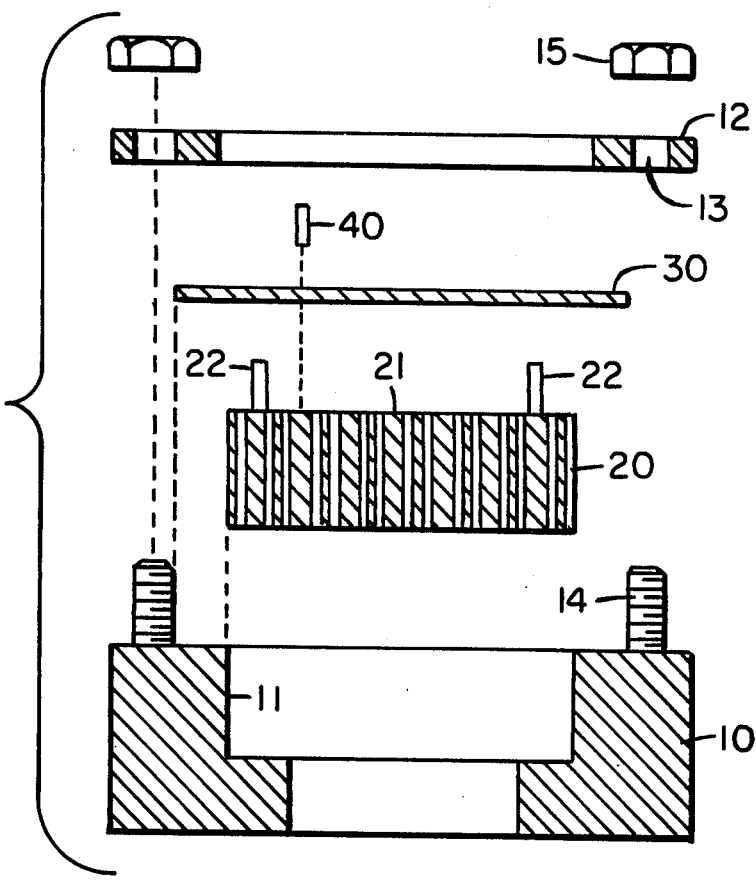
FIG. 1 is a somewhat schematic assembly view of a chuck and mask for orienting die pins in a predetermined pattern on an outlet surface of a die body.

Referring now to the drawings, and particularly FIG. 1, a chuck 10 is shown for holding a die body 20 and an aligning or fixturing mask 30. The chuck 10 has a cavity 11 for receiving the die body 20 therein with its outlet face 21 being exposed. The outlet face 21 of the die body is provided with alignment pins 22 which project within guide holes (not shown) within mask 30 for aligning and orienting the mask upon the die body. With the die body 20 positioned within the cavity 11 and the mask 30 oriented upon the alignment pins 22, a clamping plate 12 having openings 13 for receiving studs 14 in positioned over the mask and die body assembly and rigidly held in place by means of nuts 15 threaded upon the studs 14.

Figure 2:
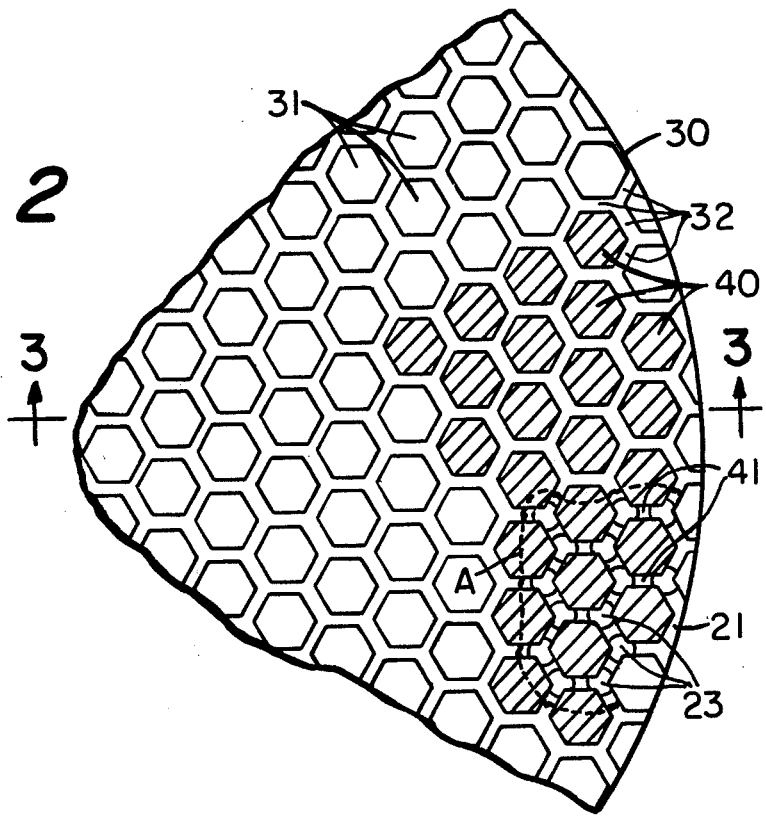
FIG. 2 is a fragmental plan view of the mask shown in FIG. 1 with a plurality of pins positioned therewithin, and with a portion of the mask broken away to show the feed holes in the die body.
Figure 3:
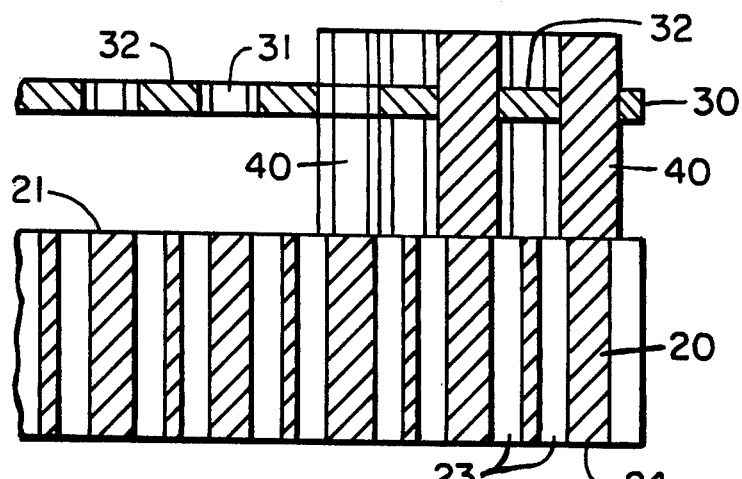
FIG. 3 is a fragmental elevational view in section taken along line 3—3 of FIG. 2.

As shown more particularly in FIGS. 2 and 3, a plurality of die pins or cores 40 are then positioned through openings 31 formed within the mask 30 and located with a desired orientation in abutting engagement with the outlet face 21 of die body 20. The die body is shown having a plurality of feed holes 23 extending from its inlet face 24 to its outlet face 21 and communicating with the base of the intersection of slots 41 formed between the pins 40. The walls 32 of the mask 30, surrounding the openings 31, accurately position the pins 40 in predetermined spaced apart orientation so that the discharge slots 41 between the pins 40 are uniform, and thereby form an extruded product with uniform cellular walls.

The mask 30 is formed of a photo-sensitively opacifiable glassy material such as a glass or glass-ceramic material, and the openings 31 formed therethrough are provided therein by etching a predetermined pattern of holes completely through the plate of photosensitive material forming the mask. The glass or glass-ceramic material forming the mask may, for example, comprise a glass composition as disclosed in U.S. Pat. Nos. 2,628,160 and 2,684,911, or a glass-ceramic composition as disclosed in U.S. Pat. No. 2,971,853. A master drawing or pattern is made of the desired size, shape and orientation of the pins forming the extrusion die, and one surface of the plate forming the mask 30 is masked with a photographic negative bearing such pattern with clear areas defining the size, shape and orientation of the desired holes 31 in the mask 30. Such mask surface of the plate is then exposed to short-wave radiations, such as ultraviolet radiations, to cause the irridated area of said surface in the pattern of holes and the internal regions of the plate therebeneath to change so that they are capable of heat developed opacification. The plate is then subjected to a heating cycle to bring about the opacification of the areas and regions in said pattern of holes, and is then subjected to or treated with a suitable etchant such as a dilute aqueous solution of hydrofluoric acid which etches the holes through the masking plate in the desired pattern. Reference is made to U.S. Pat. No. 2,628,160 and 2,971,853 for further details of the method of providing said holes in said mask, if such details are desired.

The pins 40 and the die body 20 may be formed of any suitable machinable metals such as a chrome-nickel carbon steel, coldroll steel and stainless steel, and the die is preferably made of a 1080 carbon steel. The pins are formed from precision extruded stock which are then cut into equal lengths in a manner to form smooth ends such as through the use of a screw machine. If desired, a tenon 42 may be formed on the bottom of the pins 40 which is positioned with a transition fit within a recess 25 formed in the outlet face 21 of the die body 20 (see FIG. 4). In order that batch material may be fed to the discharge slots 41 formed between the pins 40, a plurality of feed holes 23 are formed in the die body 20, such as by a drilling process. The feed holes 23 are prearranged so as to communicate with the base of the slots 41, preferably at the intersections of such slots between three adjacent pins 40. (See FIG. 2.)

Figure 4:
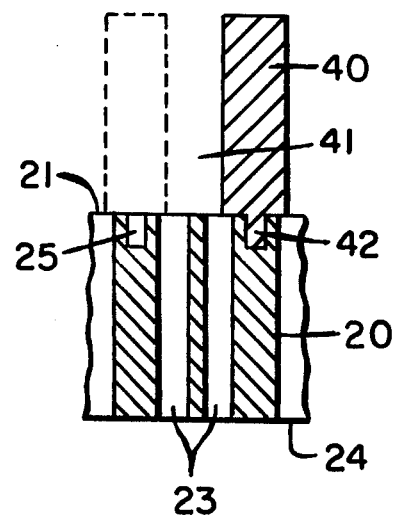
FIG. 4 is a fragmental elevational view in section of a modified connection between the pin and die.

In manufacture, a die body 20 having a plurality of prearranged feed holes 23 drilled therein is positioned within a chuck, such as shown in FIG. 1, with the outlet surface 21 of the die body being exposed. A plurality of alignment pins 22 position a mask 30 made from photosensitive material having a pattern of openings of predetermined size and shape. The assembly is then clamped together in a rigid manner and a plurality of pins 40 are positioned in a desired orientation with one pin through each opening of the mask in abutting contact with the outlet surface 21 of die body 20. The pin 40 may make a flat abutting engagement with the surface 21 as shown in FIG. 3, or it may be provided with a tenon 42 as shown in FIG. 4 which projects downwardly within a recess 25 formed in such suface 21. Each pin 40, rigidly fixtured by the mask 30, is then resistance welded to the die body 20, and the welded unit removed from the chuck and the mask broken away to produce an extrusion die for forming honeycomb structures. If desired, after the pins have been positioned by the mask with a desired orientation upon the surface 21, an epoxy or other similar material may be flown about the pins to provide added rigidity and stability to the assembly so as to inhibit any shifting of the pins prior to welding, and such material is subsequently removed either by dissolving or burning the same away.

As a specific example, an extrusion die for forming a honeycomb structure having hexagonal cells with a cell density of 200 cells per inch was formed by initially laying out a pattern representing the size, shape and orientation of the pins required to form the discharge slots of the die necessary to produce the honeycomb structure having hexagonal cells. The pattern or drawing was then used in accordance with U.S. Pat. No. 2,971,853 to form a glass-ceramic mask from photosensitive material having a pattern of holes of the desired size and shape for positioning a plurality of hexagonal pins in a desired orientation upon the surface of a die body. The die body, having a thickness of about one inch and a diameter of about 9¼ inches was made of a 1080 carbon steel and was drilled with a plurality of feed holes having a diameter of 0.052 inch oriented to communicate with the intersections of discharge slots formed by the pins oriented on the outlet face of the die body. A plurality of hexagonal shaped pins formed from H8650 stock with a length of about 0.2 inch and a diameter across flats of about 0.061 inch were provided. The die body was positioned within a chuck and the mask aligned over a six inch diameter pin area of the die, and the assembly clamped together. The pins where then positioned in each of the holes formed in the fixturing mask to provide 5,650 pins spaced 0.01 inch apart, thus producing a cell density of approximately 200 cells per square inch. The individual pins were then resistance welded to the surface of the die body and the rigidly welded unit removed from the jig and the glass-ceramic mask shattered and removed therefrom to produce a finished die for forming honeycomb structures with a hexagonal cell configuration.

Although the preferred embodiments of the invention have been disclosed, it will be apparent to those skilled in the art that various changes and modifications may be made thereto without departing from the spirit and scope of the invention as defined in the appended claims.

We claim:

1. A method of making an extrusion die for forming honeycomb structures which comprises, providing a die body having an outlet face, forming feed holes in said die body, providing a plurality of pins of desired size and shape, forming a fixturing mask from a photosensitive material with a plurality of openings extending through said mask equivalent to the cross sectional size and shape of said pins and arranged in the desired orientation of said pins, aligning said mask with said die body adjacent said outlet face, positioning said pins within the openings formed in said mask and orienting said pins in a predetermined pattern upon said outlet face, fixturing said pins within the openings of said mask with one end of said pins in engagement with said die body, welding said pins to said die body, and removing said mask from said pins.

2. A method of making an extrusion die as defined in claim 1 including the step of forming a tenon at one end of each of said pins, forming a plurality of recesses in the outlet face of said die body, and inserting said tenons of said pins within said recesses as said pins are oriented by said fixturing mask on said die body.

3. A method of making an extrusion die as defined in claim 1 including the step of forming said mask from a photosensitive glassy material and fracturing said mask upon completion of the welding of said pins to said die body to remove the mask from the pin area.

4. A method of making an extrusion die as defined in claim 1 including the step of resistance welding each of said pins to said die body.

5. A method of making an extrusion die as defined in claim 1 wherein said feed holes are drilled through said die body prior to said pins being welded to said body.

6. A method of making an extrusion die as defined in claim 1 including the steps of positioning said pins in spaced apart relationship from one another on said outlet face to form discharge slots therebetween, and forming said feed holes in said die body so as to communicate with intersections of said discharge slots.

7. A method of making an extrusion die as defined in claim 1 including the steps of forming said pins from extrusion stock having uniform cross section of desired configuration, cutting said stock into uniform lengths, and providing said plurality of pins with identical size and shape.

8. A method of making an extrusion die as defined in claim 1 including the steps of forming said fixturing mask from a glassy photosensitive material and converting said material into a glass-ceramic mask having the desired openings extending therethrough, and positioning said mask in alignment about the outlet surface of said die body.

* * * * *